United States Patent [19]

Berthoux et al.

[11] 3,932,595
[45] Jan. 13, 1976

[54] PROCESS OF MANUFACTURING CARBON BISULFIDE

[75] Inventors: Jean Berthoux, Decines; Ghislain Schwachhofer, Miribel, both of France

[73] Assignee: Rhone-Progil, Paris, France

[22] Filed: June 7, 1974

[21] Appl. No.: 477,340

Related U.S. Application Data

[63] Continuation of Ser. No. 251,980, May 10, 1972, abandoned.

[30] Foreign Application Priority Data

May 19, 1971  France............................ 71.19172

[52] U.S. Cl.................................. 423/443; 423/574
[51] Int. Cl.²........................................ C01B 31/26
[58] Field of Search.................... 423/443, 561, 574

[56] References Cited
UNITED STATES PATENTS

| 2,043,084 | 6/1936 | Ward et al. .......................... 423/474 |
|-----------|--------|----------------------------------------------|
| 2,330,934 | 10/1943 | Thacker............................... 423/443 |
| 2,369,377 | 2/1945 | Thacker............................... 423/443 |
| 2,428,727 | 10/1947 | Thacker............................... 423/443 |
| 2,562,158 | 7/1951 | Wilde................................... 423/574 |
| 2,565,215 | 8/1951 | Folkins ............................... 423/443 |
| 2,666,690 | 1/1954 | Folkins ............................... 423/443 |
| 2,788,261 | 4/1957 | Stanton............................... 423/443 |
| 3,436,181 | 4/1969 | Berthoux et al. ................... 423/443 |
| 3,743,702 | 7/1973 | Pierrot et al........................ 423/443 |

*Primary Examiner*—Oscar R. Vertiz
*Assistant Examiner*—Brian E. Hearn
*Attorney, Agent, or Firm*—Browdy and Neimark

[57] ABSTRACT

Carbon disulfide is made by contacting hydrocarbons with sulfur vapor and sulfur dioxide at temperatures between 500° – 1000°C. for 0.3 – 10 seconds in the absence of a catalyst. The total sulfur introduced as sulfur vapor and sulfur dioxide is between 2.1 and 3.5 atoms per hydrocarbon carbon atom.

6 Claims, No Drawings

PROCESS OF MANUFACTURING CARBON BISULFIDE

This is a continuation of application Ser. No. 251,980, filed May 10, 1972, now abandoned.

The present invention relates to a process for manufacturing carbon bisulfide by the reaction between hydrocarbons, sulfur vapor and sulfur dioxide.

It is known that carbon bisulfide, which originally was made by the reaction between sulfur and solid carbon, is now prepared according to processes consisting fundamentally of reacting sulfur vapor with aliphatic saturated or unsaturated hydrocarbons. These processes lead generally to satisfactory yields of carbon bisulfide, but they have the disadvantage that simultaneously hydrogen sulfide is formed as a by-product, by the combination of sulfur with the hydrogen contained in the hydrocarbons. This results in an increased and useless consumption of sulfur which must be later recovered from the hydrogen sulfide.

Moreover, the action of sulfur dioxide on hydrocarbons has been the object of several studies. It is known, for example, that this action may constitute a dehydrogenation method. When the hydrocarbon used is methane, it has been noted that several reactions may occur, according to the conditions of molar ratio and temperature which lead to the preferential formation of either hydrogen sulfide, or sulfur, or carbon oxysulfide, in addition to carbon monoxide or carbon dioxide and water or hydrogen. In some cases it has also been possible to obtain carbon disulfide from these two reagents. From a theoretical point of view, a method based on this reaction would appear to be interesting as it occurs, without the formation of hydrogen sulfide, according to the equation:

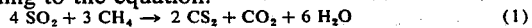
$$4 SO_2 + 3 CH_4 \rightarrow 2 CS_2 + CO_2 + 6 H_2O \qquad (1)$$

As a matter of fact, however, in most cases the selectivity in carbon bisulfide is not very satisfactory; the reaction according to equation (1), which is achieved only in the presence of a catalyst, is very difficult to control as it must compete with the other reactions mentioned. in the absence of catalysts, carbon bisulfide is not obtained at all or only in very small quantities. Moreover, the reaction according to equation(1) requires the handling and heating of very large gas volumes since two molecules of sulfur dioxide are necessary for giving the sulfur necessary to the formation of a carbon bisulfide molecule; finally, sulfur dioxide reduction gives rise to an useless consumption of hydrocarbon by its combination with the oxygen contained in $SO_2$ to give carbon dioxide.

A novel process has now been discovered which solves the precited disadvantages and gives good yields in carbon bisulfide, while utilizing a reduced quantity of sulfur, in comparison with the known processes, without any excessive hydrocarbon consumption, or requiring the handling of large gas volumes.

In its most general form, the process according to the present invention consists essentially of contacting at least one hydrocarbon with sulfur vapor and sulfur dioxide at temperatures of between 500° and 1,000°C. for 0.3 to 10 seconds in the absence of a catalyst.

It is quite surprising that, under such conditions, a satisfactory selectivity in carbon bisulfide would be obtained since, as it has been seen, the prior art teaches that, when sulfur dioxide takes part in reactions with an hydrocarbon, practically no carbon bisulfide is formed in the absence of a catalyst.

In the present specification the word hydrocarbon means any hydrocarbon compound or feed, which is gaseous or liquid under the normal conditions of temperature and pressure, including especially olefins and diolefines such as ethylene, propylene, butenes, butadienes, isoprene, pentadienes, etc., used alone or mixed, in the pure state or in the form of technical products, cyclic hydrocarbons, or complex mixtures of hydrocarbons having various structures, principally paraffinic, aromatic and naphthenic, which constitute the so-called light fuels which are obtained by distillation of crude petroleum or the so-called heavy fuels which are liquid residues of the crude petroleum distillation, said residues being sometimes admixed with crude petroleum distillates. The sulphur which may be contained in the heavy fuels is not deleterious since, on the contrary, it enters into the reaction giving carbon bisulfide.

The total quantities of sulfur and sulfur dioxide with respect to the hydrocarbon and the respective quantities of sulfur and sulfur dioxide which are introduced for the achievement of the process according to the invention may vary in large limits. In the course of this specification, the words "total sulfur" mean the sum of sulfur used as vapor and as sulfur dioxide. Fundamentally, it is preferred that the total sulfur be at least equal to the stoichiometric quantity which is necessary for the conversion of the hydrocarbon into carbon bisulfide, that is it represents at least 2 sulfur atoms for each carbon atom of the hydrocarbon. However, it has been noted that it is generally advantageous to operate with an excess of total sulfur and to use, for example, from 2.1 to 3.5 atoms of total sulfur for each carbon atom.

The relative proportions of sulfur vapor and sulfur dioxide are not especially critical factors and may correspond, in a general way, to a molar ratio of $S/SO_2$ of between 0.2 and 5. However, it has been found that the process gave better results on the whole when the sulfur dioxide was present in a quantity at least sufficient for the oxygen it provides may form water with all of the hydrogen atoms present in the hydrocarbon used. For the calculation of this minimal quantity of sulfur dioxide, it is possible to use the following equation(2) which represents theoretically the reaction mechanism:

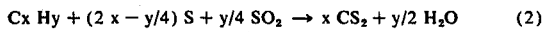
$$C_x H_y + (2x - y/4) S + y/4 SO_2 \rightarrow x CS_2 + y/2 H_2O \qquad (2)$$

This means that the number of sulfur dioxide moles introduced is preferably at least equal to one fourth the number of hydrogen atoms present in the hydrocarbon entering into the reaction. If, according to the most advantageous form of the invention, it is operated with an excess of total sulfur, this may be brought about either by sulfur vapor, or by sulfur dioxide, or simultaneously by both reagents. However, it is preferred, in most cases, that this excess be furnished by the sulfur vapor.

When a complex mixture of hydrocarbons is used as the hydrocarbon source as is the case with light and heavy fuels, the relative proportions of sulfur, sulfur dioxide and hydrocarbon may be established as indicated above, starting with the carbon content of the hydrocarbon source and from an empirical formula which reproduces the mean number of hydrogen atoms for each carbon atom of the hydrocarbon source.

The process according to the invention is conducted at a temperature of between 500° and 1000°C., more especially 600° to 900°C. with residence times which, in a general way, may vary between 0.3 and 10 seconds, but preferably between 1 and 5 seconds.

Besides there is some correlation between those two parameters : so; on the whole, the higher the temperature, the shorter is the residence time. On the other hand, for each particular case, the temperature to be adopted within the scope of the invention, depends on other factors, especially the nature of the hydrocarbon used and the relative proportions of the reagents. For example, the reaction with olefines occurs very easily using the lower range of temperatures within the scope of the invention. Further the temperature may also depend upon the carbon content of a hydrocarbon, within a given class of said compounds. Besides, the presence of an excess of total sulfur, especially as sulfur vapor permits the choice of a temperature among the lowest values for a given hydrocarbon; in other words, at the same temperature an excess of sulfur favors the reaction.

The process according to the invention is not perceptibly modified by pressure conditions. It may be conducted perfectly well under a pressure which is greater than normal, but it is achieved as well under atmospheric pressure, which constitutes one of its advantages.

In practice, it is possible to inject separately into a reaction chamber maintained at the required temperature, the hydrocarbon and the sulfur dioxide preheated or not, and the sulfur which has been already brought at least to its minimal temperature of vaporization, that is about 450°C. However, it is preferred that the sulfur be at a higher temperature before entering the reactor which may be that of the reaction. It is also possible to introduce sulfur dioxide mixed with the hydrocarbon or sulfur while the third reagent is introduced separately. Injection of the sulfur dioxide and sulfur vapor as a premixture, constitutes a convenient way of practicing the invention. Indeed it is possible to introduce into a combustion apparatus preceding the reaction chamber, liquid sulfur in a quantity corresponding to the total sulfur necessary for reaction and to burn a part of it for producing sulfur dioxide; simultaneously the combustion heat allows for vaporization of the complement of free sulfur. Adjusting the quantity of air or oxygen to be used for the combustion, it is possible to control easily the rate of burnt sulfur and consequently the mixture composition, as well as the final temperature thereof. When the hydrocarbon is a liquid, it is according to each case, vaporized before entering in contact with the other reagents, or sprayed into the reaction chamber.

At the reactor outlet the reaction effluent contains a major proportion of carbon bisulfide, unchanged sulfur or sulfur dioxide, particularly when these reagents were used in excess, water and generally low quantities of by-products such as carbon monoxide, carbon dioxide, and possibly hydrocarbons resulting from the cracking of the hydrocarbon initially used. There is also generally observed the presence of a certain quantity of hydrogen sulfide. In order to separate carbon bisulfide from this effluent, excess of sulfur is first condensed if necessary, the gaseous effluent is cooled in a classical way, down to about 120°– 150°C., then the remaining mixture is passed into an absorption liquid such as an alkaline solution, in order to remove the acid constituents, finally the carbon bisulfide and water are condensed and are easily separated by decantation. The noncondensed and unabsorbed gases may be recycled to the reaction. According to another possibility, after the possible condensation of excess sulfur, wholly or partly, the reaction effluent is treated in therefor water to regenerate sulfur from the hydrogen sulfide and sulfur dioxide present. The reaction between $H_2S$ and $SO_2$ in an aqueous medium may be achieved in any manner especially according to the processes described by the applicants in their U.S. applications No. 159,735 filed July 6, 1971 and No. 165,037 filed July 23, 1971. If either of the two reagents is not found in a sufficient quantity in the gaseous effluent adjustment to the desired value is made by feeding with fresh reagent. According to the first of the two precited applications, regenerated sulfur is present in solution in the condensed carbon bisulfide. The carbon bisulfide is distilled and sulfur is recovered at the foot of the column. According to the second application, regenerated sulfur is in a solid state and the carbon bisulfide is gaseous. Then, the latter is condensed.

The following examples, given in a non-limitative way, illustrate the object of the present invention.

EXAMPLE 1

In a tubular reactor surrounded by an oven and followed by a sulfur condenser, an absorber filled with a NaOH solution and a condenser for carbon bisulfide and water, there was introduced on the one hand a mixture of sulfur and sulfur dioxide brought to the reaction temperature and on the other hand non-preheated ethylene. The respective proportions of reagents were varied as well as the reaction temperatures and residence times. At the reactor outlet, the excess sulfur was condensed, then the gaseous effluent was passed through the absorber in which acid constituents were removed and finally went into the condenser in which carbon bisulfide and water were separated. The remaining gaseous phase was recovered. Analyses were made chemically and by chromatography in vapor phase. Operative conditions of each test and the results obtained are given in Table 1 hereinafter.

TABLE 1

| No. of S atoms/ mole of ethylene (S as sulfur vapor) | No. of $SO_2$ moles/ mole of ethylene | Patio S/C S as total sulfur | Temp- erature °C. | Resi- dence time (sec.) | Ethyl- ene conver- sion % | $CS_2$/ carbon contain- ing com- pounds formed % | Molar ratio $CS_2/H_2S$ formed |
|---|---|---|---|---|---|---|---|
| 4.4 | 1 | 2.7 | 600 | 3.8 | 89 | 90.8 | 2.3 |
| 5.24 | 1 | 3.12 | 650 | 3.2 | 99.8 | 86.7 | 3 |
| 4.24 | 1 | 2.62 | 650 | 3.6 | 98.2 | 85.8 | 3.2 |
| 4.4 | 1 | 2.7 | 700 | 3.4 | 98.6 | 85.9 | 4 |

These tests emphasize the advantages of the process; indeed, a good conversion of hydrocarbon and a satisfactory selectivity in carbon bisulfide are obtained. Moreover, it is seen that hydrogen sulfide formation is strongly reduced by comparison with the classical processes using only sulfur, in which the ratio $CS_S/H_2S$ would be in this case, 1.

EXAMPLE 2

The tests of Example 1 were repeated but using this time propylene instead of ethylene. The results obtained are given in Table 2 hereinafter:

TABLE 2

| No. of S atoms/mole of propylene (S as sulfur vapor) | No. of $SO_2$ moles/mole of propylene | Ratio S/C S as total sulfur | Temp. °C. | Residence time (sec.) | $CS_2$/carbon containing compounds formed %. |
|---|---|---|---|---|---|
| 5.7 | 1.5 | 2.4 | 650 | 4 | 85 |
| 5.7 | 1.5 | 2.4 | 700 | 4 | 83 |
| 5.7 | 1.5 | 2.4 | 800 | 4 | 80 |
| 5.7 | 1.5 | 2.4 | 800 | 2 | 83 |
| 6.6 | 1.5 | 2.7 | 700 | 4 | 91 |

From the above tests in which certain of the reaction parameters were varied and in which propylene conversion was practically quantitative, it appears that it is better to reduce residence time when increasing temperature and that for a given temperature, an increase of sulfur excess favors the reaction.

EXAMPLE 3

The hydrocarbon source used was this time a light fuel consisting of a crude petroleum distillate containing 65 w. % compounds boiling under 270°C and having a viscosity of 9.5 centistokes at 20°C. Its empirical formula was $CH_{1.9}$.

In a device of the same type as described in example 1 there was introduced a mixture of sulfur and sulfur dioxide brought to the reaction temperature and the light fuel previously heated to 250°C. The fuel vaporization came to completion as soon as said fuel entered the reactor.

The ratio total sulfur/carbon was 3.5; the number of $SO_2$ moles for each carbon atom was 0.80. The temperature was 800°C and the residence time 1.6 seconds.

The fuel conversion rate was practically quantitative and the carbon bisulfide yield was 65 %. The molar ratio $CS_2/H_2S$ formed was 12.

What is claimed is:

1. A process for manufacturing carbon disulfide comprising
   contacting and reacting a hydrocarbon selected from the group consisting of olefins, diolefins, cyclic hydrocarbons, light fuels and heavy fuels with both sulfur vapor and sulfur dioxide at temperatures between about 500°– 1000°C. for a period of 0.3 to 10 seconds in the absence of a catalyst,
   the total sulfur introduced as sulfur vapor and sulfur dioxide being at least equal to the stoichiometric quantity necessary for the conversion of the hydrocarbon into carbon disulfide and
   the number of moles of sulfur dioxide introduced being at least equal to one fourth of the number of hydrocarbon hydrogen atoms.

2. A process according to claim 1 wherein the total sulfur introduced as sulfur vapor and sulfur dioxide is between 2.1 and 3.5 atoms per hydrocarbon carbon atom.

3. A process according to claim 2 wherein the period of contact is 1 to 5 seconds.

4. Process according to claim 1 wherein the sulfur vapor and sulfur dioxide are introduced as a pre-mixture.

5. Process according to claim 1 wherein the gaseous reaction effluent is treated in water to regenerate sulfur from the hydrogen sulfide and sulfur dioxide present in said gaseous reaction effluent, adjusting the quantity of either of the two reagents hydrogen sulfide or sulfur dioxide to the desired value by feeding fresh reagent, and recovering carbon bisulfide and sulfur generated by the reaction of said reagents.

6. A process according to claim 1 wherein the gaseous reaction effluent is treated to condense excess sulfur, then the remaining effluent is passed into an absorption liquid to remove acid constituents, and carbon bisulfide and water are condensed with recovery of the carbon bisulfide.

* * * * *